(12) United States Patent
Kumar (10) Patent No.: US 10,412,077 B2
(45) Date of Patent: Sep. 10, 2019

(54) IDENTITY AUTHENTICATION MIGRATION BETWEEN DIFFERENT AUTHENTICATION SYSTEMS

(71) Applicant: CA, Inc., New York, NY (US)

(72) Inventor: Nikhil Kumar, New York, NY (US)

(73) Assignee: CA, Inc., New York, NY (US)

( * ) Notice: Subject to any disclaimer, the term of this patent is extended or adjusted under 35 U.S.C. 154(b) by 637 days.

(21) Appl. No.: 15/076,241

(22) Filed: Mar. 21, 2016

(65) Prior Publication Data

US 2017/0272419 A1 Sep. 21, 2017

(51) Int. Cl.
*H04L 29/06* (2006.01)
*G06F 16/11* (2019.01)

(52) U.S. Cl.
CPC .......... *H04L 63/0823* (2013.01); *H04L 63/06* (2013.01); *G06F 16/119* (2019.01); *H04L 63/0884* (2013.01)

(58) Field of Classification Search
CPC . H04L 63/08; H04L 63/0428; H04L 63/0823; H04L 63/0884; H04L 63/06; G06F 16/119
See application file for complete search history.

(56) References Cited

U.S. PATENT DOCUMENTS

| | | | |
|---|---|---|---|
| 7,055,042 B1 | 5/2006 | Gough et al. | |
| 8,027,921 B1 | 9/2011 | Boydstun et al. | |
| 8,266,440 B2 | 9/2012 | Tamura | |
| 2006/0129831 A1* | 6/2006 | Andreev | H04L 63/1425 713/183 |
| 2007/0083917 A1 | 4/2007 | Peterson et al. | |
| 2014/0189808 A1* | 7/2014 | Mahaffey | H04L 63/083 726/4 |
| 2016/0014196 A1* | 1/2016 | Azulay | G06F 21/31 726/3 |
| 2016/0226848 A1* | 8/2016 | Yuan | H04L 63/08 |

* cited by examiner

*Primary Examiner* — Joseph P Hirl
*Assistant Examiner* — Chi D Nguy
(74) *Attorney, Agent, or Firm* — Gilliam IP PLLC (57) ABSTRACT

An intermediary can securely migrate a security credential between systems despite different underlying encoding technologies used for authentication by the system. This intermediary can also securely migrate an identity between different authentication technologies. A secure login interface program code that is digitally signed by the intermediary is provided in advance to devices that will source authentication requests. The interface program code is at least secure because it has been digitally signed by the intermediary. An instance of the secure interface program code directs authentication requests entered into the interface instance to the intermediary, which is at least identified by the digital signature. After a successful authentication by a destination system identified by the authentication request, the intermediary can migrate the authenticated security credential to a migration target.

20 Claims, 7 Drawing Sheets

IDENTITY AUTHENTICATION MIGRATION BETWEEN DIFFERENT AUTHENTICATION SYSTEMS

BACKGROUND

The disclosure generally relates to the field of security technology, and more particularly to secured credential migration between systems.

A common authentication system authenticates a user with login credentials that includes an identity (e.g., user identity or account identity) and a password, which are provided to the system. When initially setting up an account, the authentication system will encode the password with a cryptographic technology (e.g., generate an irreversible hash of the password or encrypt the password) to securely store the password in a repository (e.g., relational database, lightweight directory access protocol (LDAP) repository, etc.). If multi-factor authentication is used, then additional security credentials that may be stored include biometric data, a security token, etc. When later authenticating an identity, the authentication system encodes a received security credential(s) and compares it against the stored encodings of security credentials.

BRIEF DESCRIPTION OF THE DRAWINGS

Embodiments of the disclosure may be better understood by referencing the accompanying drawings.

DESCRIPTION

The description that follows includes example systems, methods, techniques, and program flows for embodiments of the disclosure. However, it is understood that this disclosure may be practiced without these specific details. In other instances, well-known instruction instances, protocols, structures and techniques have not been shown in detail in order not to obfuscate the description.

Introduction

For various reasons, an enterprise may use different encoding technologies for security credentials. An enterprise may add or transition to a different application, platform, or service that uses a different encoding technology. An enterprise may begin conducting business in a jurisdiction with regulations that require a different encoding technology for compliance. Moreover, an enterprise may add or transition to an application, service, or platform that uses a different authentication technology, such as an authentication technology that eschews passwords.

Overview

An intermediary can securely migrate a security credential between systems despite different underlying encoding technologies used for authentication by the system. This intermediary can also securely migrate an identity between different authentication technologies. A secure login interface program code (e.g., program code according to an application programming interface) that is digitally signed by the intermediary is provided in advance to devices that will source authentication requests (e.g., computers or smartphones used for logging into a system to access data, applications, etc.). The interface program code is at least secure because it has been digitally signed by the intermediary. An instance of the secure login interface program code directs authentication requests entered into the interface instance to the intermediary, which is at least identified by the digital signature. After a successful authentication, the intermediary can migrate the authenticated security credential to a migration target by requesting the migration target to update its secured credential repository with the security credential for the corresponding identity. The intermediary can submit this request because trust between the migration target and the intermediary has been established in advance.

Example Illustrations

Figure 1:
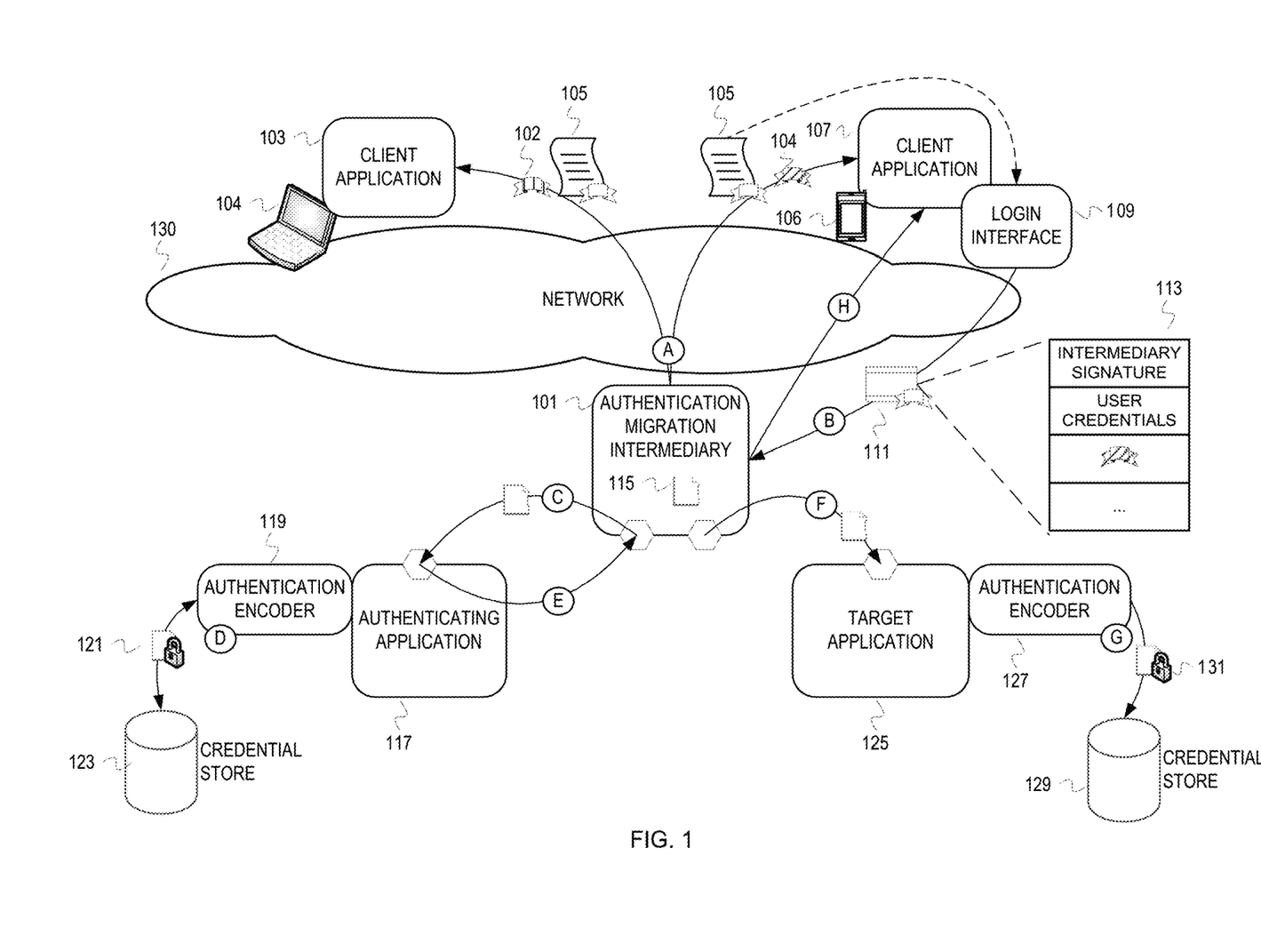
FIG. 1 depicts an example diagram of an intermediary migrating a security credential between applications that employ different cryptographic encoders for authentication.

FIG. 1 depicts an example diagram of an intermediary migrating a security credential between applications that employ different cryptographic encoders for authentication. In FIG. 1, a device 104 (depicted as a computer) hosts a client application 103 and a device 106 hosts a client application 107. The client applications 103, 107 may be deployed components of an authenticating application 117 or distinct applications that access a service provided by the authenticating application 117 and/or a target application 125 via a network 130. The authenticating application 117 and the target application 125 may be web-based applications/services, enterprise level applications, etc. Although referred to as the "authenticating" application, the authenticating application 117 is not primarily for authentication. The label is used merely to note the aspect that the authenticating application 117 initially processes login credentials with respect to the migration and the target application 125.

For this example, several trust relationships have already been established. Users of the client applications 103, 107 have already established identities and security credentials with the authenticating application 117. Security credentials (e.g., passwords) have already been encoded by an authentication encoder 119 associated with the authenticating application 117. The authentication encoder 119 may be a component of the authentication application 117 or a separate program invoked by the authentication application 117 with an application programming interface (API), may be a library file, etc. The authentication encoder 119 uses cryptographic encoding technology (e.g., irreversible hashing, encryption) to encode the security credentials. The encoded security credentials are stored in the credential store 123 for authentication of later submitted credentials. An authentication migration intermediary 101 has established trust with the authenticating application 117 and the target application 125 by administrator settings, configuration, etc. As part of establishing this trust, the authentication migration intermediary 101 is provided information to interact with the authenticating application 117 and the target application 125 (e.g., an API, web service communication information, code to access the applications, etc.). The authentication migration intermediary 101 has established trust with the client applications 103, 107 with program code that has been digitally signed by the authentication migration intermediary 101 ("digital program code signature"). The digitally signed program code is provided to the client applications 103, 107 to allow the authentication migration intermediary 101 to validate incoming requests. The signed program code is a login interface that accepts login credentials (i.e., identity and security credential) and generates an authentication request that is sent to the authentication migration intermediary 101 for migration processing. The authentication migration intermediary 101 also establishes trust with each client application in advance. For each client application, the authentication migration intermediary 101 generates a security token that can be used to identify the relationship or connection between the authentication migration intermediary 101 and the client application. This relationship identifying token and the digitally signed program code add additional layers of security on top of security provided by the communication protocol being used (e.g., Secure Sockets Layer security) for the communications.

FIG. 1 is annotated with a series of letters A-H. These letters represent stages of one or more operations each. Although these stages are ordered for this example, the stages illustrate one example to aid in understanding this disclosure and should not be used to limit the claims. Subject matter falling within the scope of the claims can vary with respect to the order and some of the operations.

At stage A, the authentication migration intermediary 101 provides digitally signed secure login interface program code 105 (also referred to as "secure interface program code") to the client applications 103, 107 and provides relationship specific security tokens 102, 104. The authentication migration intermediary 101 may communicate these differently: transmit these to the client applications 103, 107, or communicate a location to the client applications 103, 107 for retrieval by the client applications 103, 107. Other channels (e.g., installation by an administrator) may also be used to distribute the digitally signed secure interface program code 105. The digital signature includes information that identifies the authentication migration intermediary 101 (e.g., network address, port identifier, application identifier, etc.). The digital signature can also include an encoding (e.g., hash value) of some or all of the identifying information. The authentication migration intermediary 101 communicates the security token 102 to the client application 103. The security token 102 comprises encoded information that uniquely identifies the pairing of the client application 103 and/or the device 104 and the authentication migration intermediary 101. For example, the security token 102 may be a hash of a concatenation of the network addresses and ports of the client application 103 and the authentication migration intermediary 101. Likewise, security token 104 comprises encoded information that uniquely identifies the pairing of the client application 107 and/or the device 106 and the authentication migration intermediary 101.

At stage B, the client application 107 communicates a signed authentication request 111 to the authentication migration intermediary 101. The client application 107 invokes the signed secure interface program code 105 to accept submission of an identity and a security credential. Invocation of the secure interface program code 105 causes presentation of a login interface 109 to accept the submitted identity and security credential. The login interface 109 generates an authentication request with the submitted security credential for the submitted identity. The login interface 109 signs the authentication request with the digital signature of the signed secure interface program code 105. For instance, the login interface includes a hash value and information that identifies the authentication migration intermediary 101. The signed secure interface program code 105 specifies a destination for the signed authentication request 111 as the authentication migration intermediary 101, although the destination for the authentication request is the authenticating application 117. The login interface 109 can also set a flag or value to indicate that the submitted credential is to be migrated. The client application 107 also incorporates the security token 104 into the request 111, for example as part of the payload of the request 111.

At stage C, the authentication migration intermediary 101 communicates the authentication request to the authenticating application 117 for authentication of the submitted identity. The authentication migration intermediary 101 validates the digital signature of the signed authentication request 111, and determines that the request 111 includes the relationship security token 104. After validation of the request 111 based on the digital program code signature and the security token 104, the intermediary 101 securely stores (e.g., encrypts) the security credential 115 for the identity. This storing by the intermediary can be considered "caching" of the security credential 115 since it is temporary. The intermediary 101 "caches" the security credential because an authentication response typically does not return the security credential that was authenticated (i.e., an authentication response will not include a security credential). The authentication migration intermediary 101 does not persist the security credential 115 at least one of a condition (e.g., migration complete) and a retention period. The authentication migration intermediary 101 examines the authentication request to determine the destination for the authentication request. The authentication migration intermediary 101 can determine an application identifier from the signed authentication request and lookup the authentication request destination based on the application identifier and communicate the authentication request to the authenticating application 117.

At stage D, the authentication encoder 119 encodes the security credential 111 and determines whether the encoded security credential 121 matches an entry in the credential store 123 for the associated identity. The authentication encoder 119 can access the credential store 123 with the submitted identity as an index. The submitted identity resolves to an encoded security credential. If the authentication encoder 119 determines a match, then the authentication is successful. Otherwise, the authentication has failed.

At stage E, the authenticating application 117 returns an authentication response to the authentication migration intermediary 101. From the perspective of the authenticating application 117, the authentication migration intermediary is the requestor even though the source of the authentication request was the client application 107. Session information maintained by the communicating entities according to the used communication protocol(s) ensures the result of the authentication eventually returns to the source of the authentication request (i.e., the client application 107 in this example).

At stage F, the authentication migration intermediary 101 migrates the security credential for the identity to the target application 125. After receiving a successful authentication response, the authentication migration intermediary 101 generates an update request that includes the security credential 115 and the identity. The authentication migration intermediary 101 communicates the update request to the target application 125 to cause the target application to add the authenticated identity with the security credential 115 to its credential store 129.

At stage G, the target application 125 updates its credential store 129 with the identity and security credential. An authentication encoder 127 used by the target application 125 encodes the communicated security credential 115 with a cryptographic technology that is different than the technology employed by the authentication encoder 119. For instance, one might use encryption while the other uses hashing. Or the two may both hash security credentials, but with different hashing algorithms.

At stage H, the authentication migration intermediary 101 communicates the authentication response to the client application 107. As previously mentioned, the authentication migration intermediary 101 can rely on session information maintained according to an implemented communication protocol(s) to return the authentication response. The authentication migration intermediary 101 could itself maintain data that tracks in-flight authentication requests with indications of the request source in order to return an authentication response to the appropriate requestor.

Figure 2:
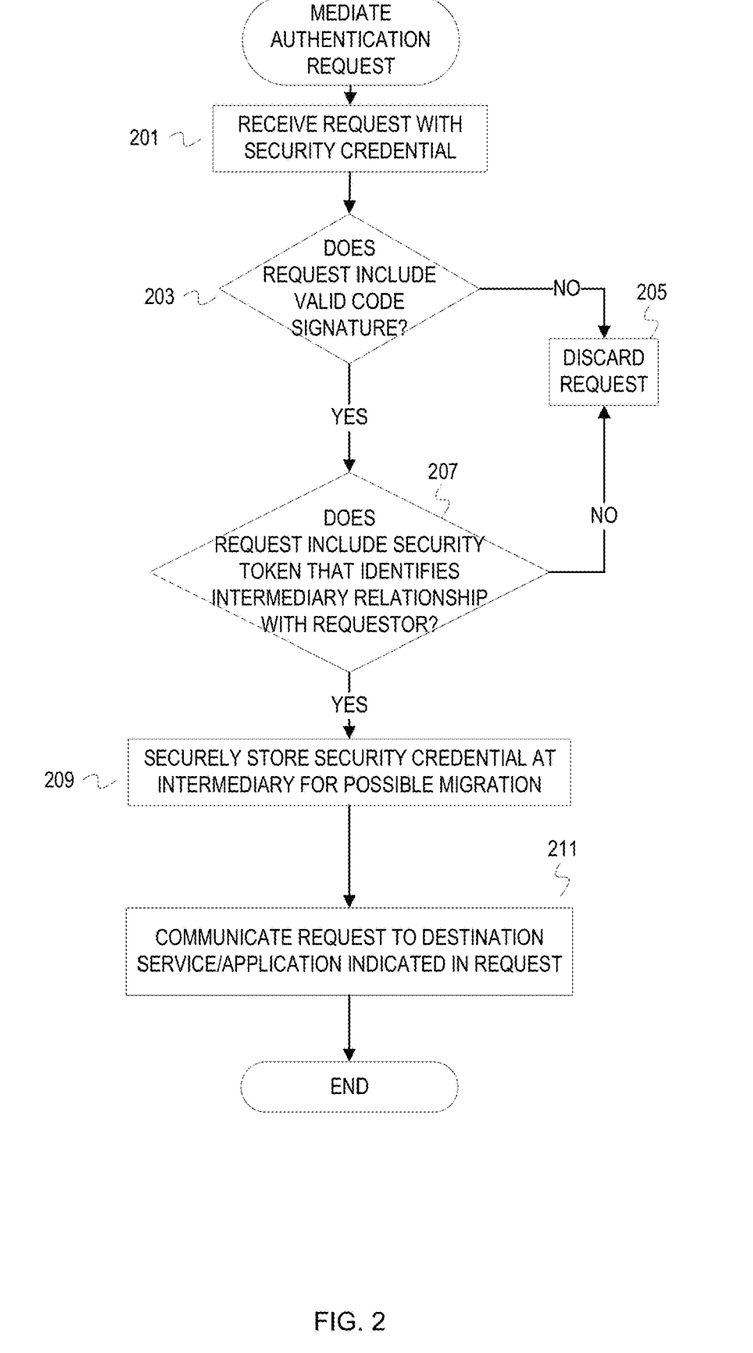
FIG. 2 is a flowchart of example operations for mediating an authentication request.
Figure 3:
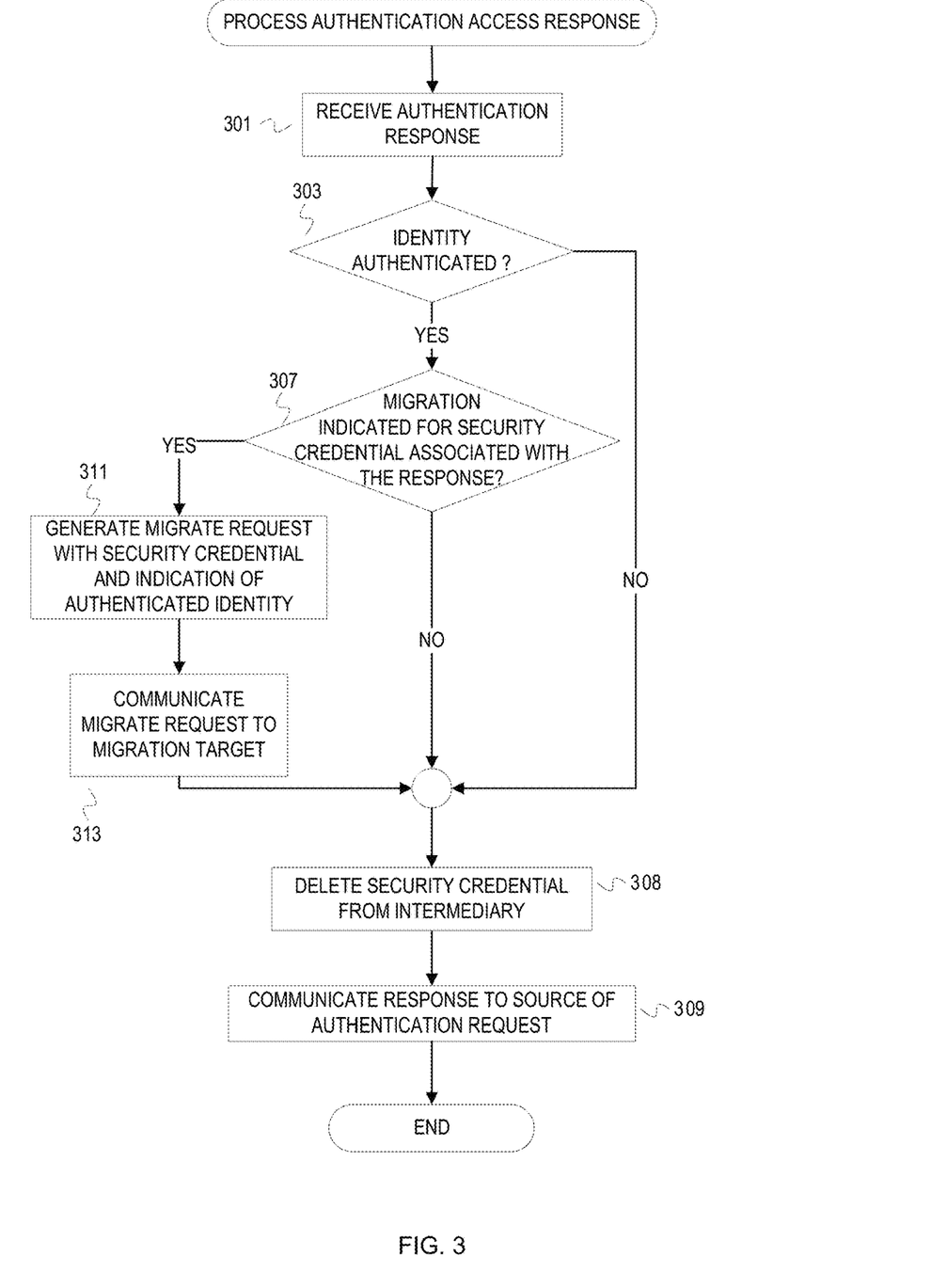
FIG. 3 is a flowchart of example operations for processing an authentication response.
Figure 4:
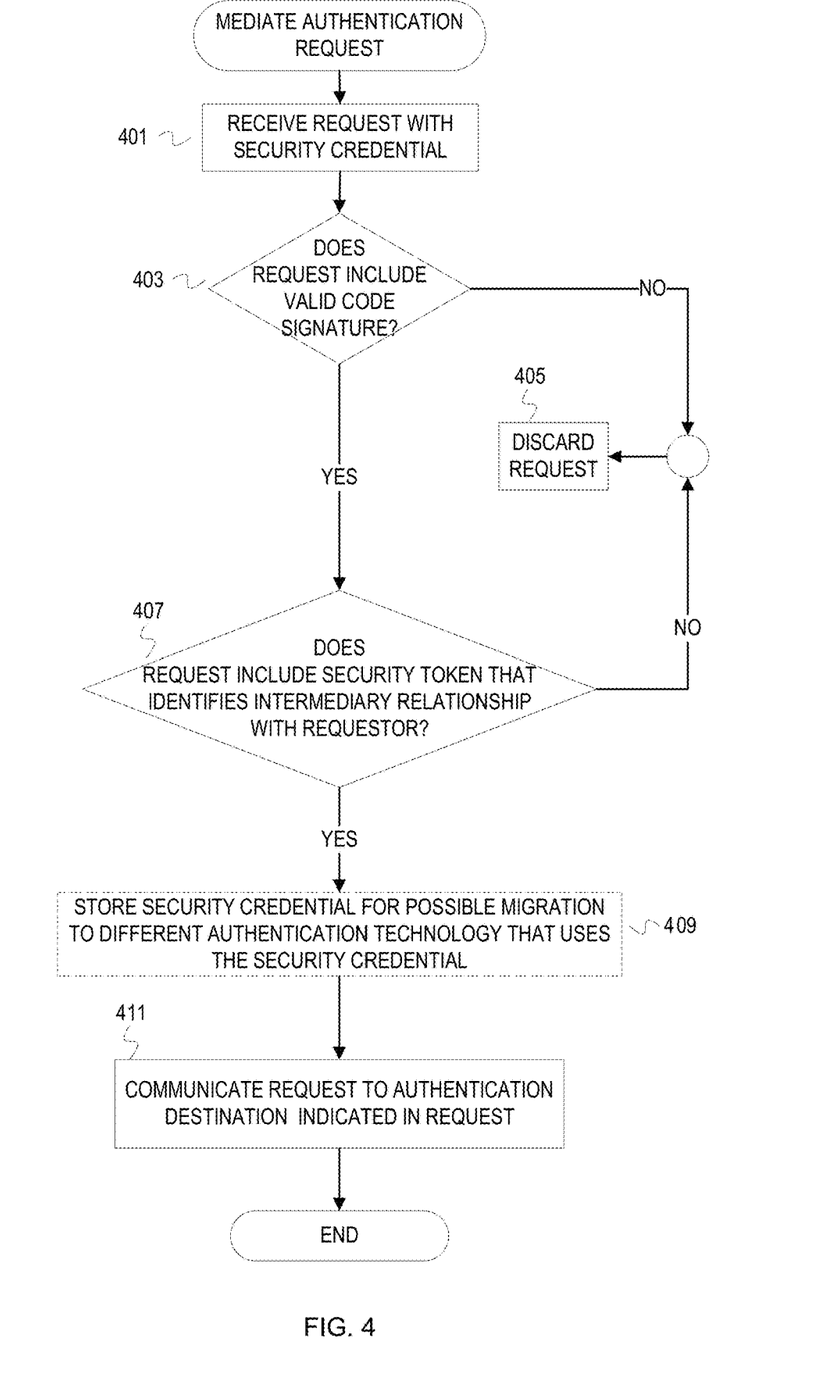
FIG. 4 is a flowchart of example operations for mediating an authentication request for authentication technology migration.
Figure 5:
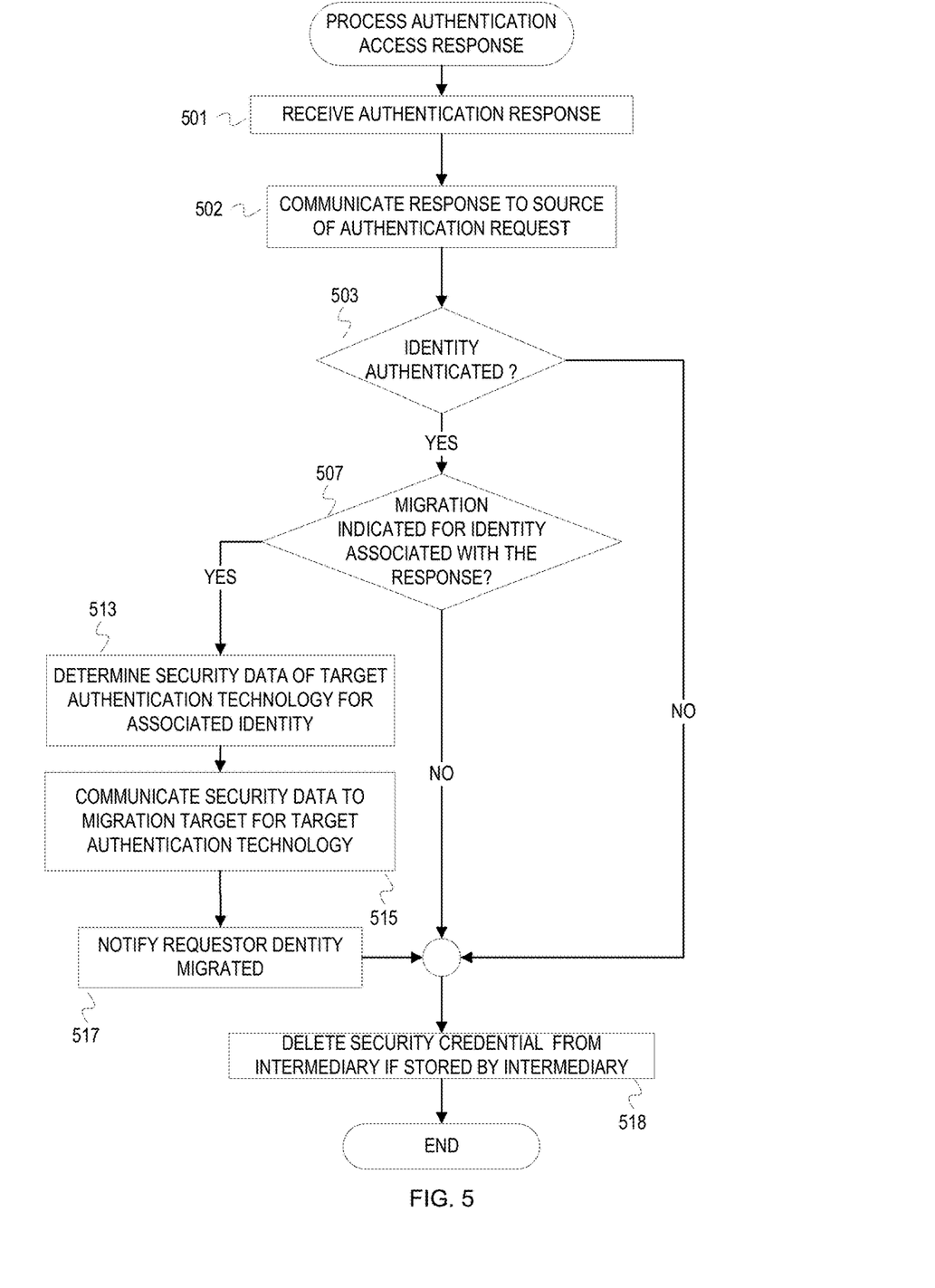
FIG. 5 is a flowchart of example operations for processing an authentication response for authentication technology response.
Figure 6:
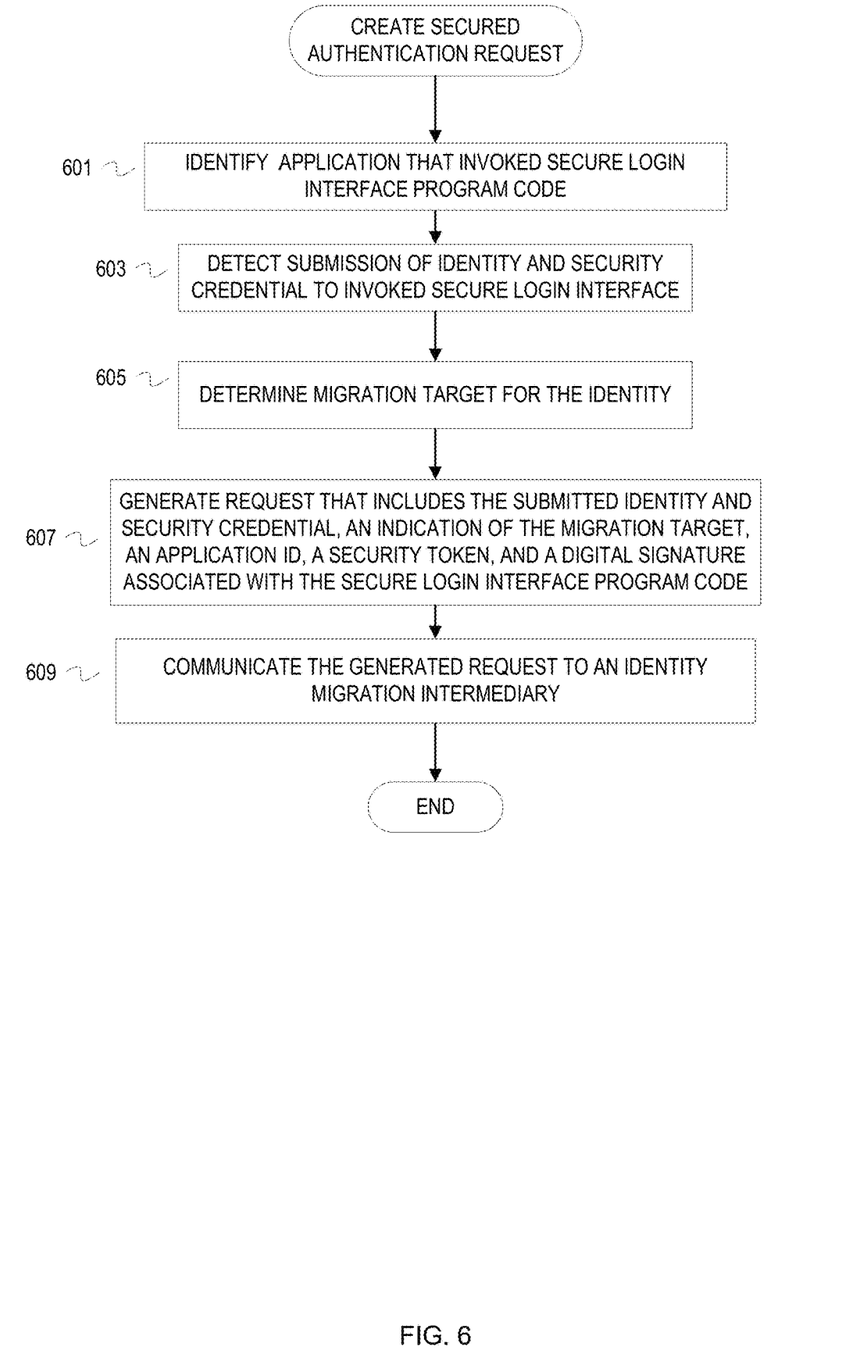
FIG. 6 depicts a flowchart of example operations for creating a secured authentication request.

Although FIG. 1 provides an example illustration to help understand the disclosure, the following figures provide additional details of particular operations that are not specific to a particular deployment as with the example illustration of FIG. 1. For instance, FIG. 1 refers to migrating between applications while the subsequent figures refer to systems. This change in terminology is done to avoid unintended interpretations that attempt to constrain migrations to executing instances of program code (i.e., an application). The term "system" can be an application, an application and storage used by the application, a service used by a collection of applications (e.g., an identity management service), etc. FIGS. 2-3 depict flowcharts of example operations for migrating a security credential between systems that use different encoding technologies. FIGS. 4-5 depict flowcharts of example operations for migrating an identity between systems that use different authentication technologies. FIG. 6 depicts a flowchart of example operations for generating a request with a secure interface provided by an authentication migration intermediary. FIGS. 2-5 will refer to an intermediary as performing the operations for term consistency with FIG. 1. The intermediary likely runs on a host device that is distinct from the devices that source authentication requests, from devices that host entities that authenticate an identity, and from devices that host migration targets. However, the intermediary can be program code that runs on a device that also hosts an authentication entity. As an example, the intermediary and the authenticating entity may run on virtual machines hosted on a same device.

FIG. 2 is a flowchart of example operations for mediating an authentication request. As discussed above, the authentication request is from an invoked secure interface program code that was signed with information that identifies the intermediary. The intermediary "mediates" the authentication request because it operates between the requestor, the authenticator, and the migration target.

The intermediary receives a request with a security credential (201). The intermediary should receive requests from clients that have been provided the digitally signed program code for the secure interface. The intermediary receives the request over a secure connection established between the intermediary and the requesting client according to a protocol, such as Transport Layer Security or Secure Sockets Layer. This provides a first level of security for credentials. The intermediary records a request identifier that identifies the received request, which is later used by the intermediary to match with an authentication response.

The intermediary then determines whether the request includes a valid code signature (203). If the request was generated and sent from a secure interface, the request will include a digital signature of the intermediary. If the digital signature comprises a hash value, then the intermediary will compare the hash value against the intermediary's known digital signature hash. The digital signature may only comprise data that identifies the intermediary (e.g., application identifier, host device address, etc.). The intermediary may be associated with multiple digital signatures (e.g., a different signature for each authenticating system). The intermediary can validate some or all of the identifying information. If the request does not include a valid code signature, then intermediary discards the request (205). The intermediary can preserve the request or aspects of the request for forensic purposes.

If the request includes a valid code signature, then the intermediary determines whether the request includes a valid security token that identifies an established trust relationship between the requestor and the intermediary (207). In addition to previous deployment of digitally signed secure login interface program code, the intermediary establishes individual trust relationships with clients with security tokens that identify those relationships. For instance, the intermediary can determine a network address and application identifier for a client. The intermediary can then generate a hash value based on the client applicant's network address and application identifier, and identifying information of the intermediary. The intermediary then provides the individual security tokens to respective clients. If the request does not include a valid security token, then the request is discarded (205). Although not necessary, the intermediary can provide the requestor with a response that indicates failure of the request without specifying a reason for the failure.

If the request is valid, then the intermediary securely stores the security credential (209) for possible migration. The intermediary stores the security credential locally because this stored security credential is what the intermediary will transmit to a migration target, if the intermediary receives an indication that the security credential is to be migrated. The intermediary can store the security credential in association with other data to track the in-flight requests (i.e., the requests pending a success or fail result of authentication). The intermediary can maintain this in-flight tracking data in any type of storage media (including volatile and non-volatile memory (e.g., random access memory) that indexes security credentials with in-flight authentication requests by identity and/or request identifier. These are removed when authentication responses are received and/or when a time period expires to avoid persisting security credentials at the intermediary.

After securely storing the security credential (209), the intermediary communicates the authentication request to an authentication destination indicated in the request (211). The secure interface may construct the authentication request with additional fields in a header or body of the authentication request or wrap an authentication request with header information. The additional fields and/or header information will have information used by the intermediary (e.g., the digital program code signature, a migration flag, and indication of authentication destination). The indication of the authentication destination can include a network address and port identifier that corresponds to an application that will authenticate the identity with the security credential. In some cases, the indication of the authentication destination can be an application identifier that the intermediary resolves to a location. For example, the intermediary may maintain a table of application identifiers that index to one or more locations that host a corresponding application. The intermediary can select from the one or more locations and communicate the authentication request to that selected location. If the authentication request is wrapped with the additional information used by the intermediary or the authentication request includes additional fields, the intermediary can remove the header and/or additional fields before communicating to the authentication destination.

FIG. 3 is a flowchart of example operations for processing an authentication response. The intermediary processes authentication responses to determine whether to migrate a successfully authenticated identity and security credential.

The intermediary receives an authentication response (301). An intermediary can have multiple in-flight authentication requests and receive responses from different authenticators/authentication destinations.

The intermediary determines whether the identity was authenticated (303). If the authentication response indicates failed authentication, then the intermediary deletes the security credential entry for security purposes (308). If the identity was successfully authenticated with the security credential, then the intermediary determines whether the authentication response (or a separate but associated command/instruction) indicates that the security credential The intermediary determines whether migration is indicated for the security credential (307). The authentication response will indicate whether the security credential is to be migrated. The authentication response will also indicate the identity that was authenticated and a request identifier of the authentication request. The intermediary uses the identity and/or request identifier indicated in the authentication response to lookup the corresponding security credential maintained by the intermediary. If the security credential is not found, then the intermediary communicates the authentication response, whether successful or failed, to the source of the authentication request (309). The source can be determined from the request identifier and/or communication protocol session/connection information. A security credential to be migrated may not be found by the intermediary in memory of the intermediary for various reasons. For example, the intermediary may expire security credentials for security reasons and may not receive the response until after expiration of the security credentials, the intermediary may have restarted, etc.

After determining that a security credential was used to successfully authenticate an identity (303) and that the security credential is to be migrated (307), the intermediary generates a migrate request for the authenticated identity (311). The intermediary includes the security credential and indicates the authenticated identity in the migrate request.

The intermediary then communicates the migrate request to a migration target (313). As mentioned earlier, the migration target may have been specified in the signed authentication request. In some embodiments, the migration can also or alternatively be specified at the intermediary or as part of establishing the trust relationships discussed previously. The migration target may also be indicated in the authentication response.

If the security credential is not to be migrated (307) or after communicating the migrate request (313), the intermediary removes the security credential from memory of the security credential if previously stored by the intermediary (308). The intermediary then communicates the authentication response of success or failure to the source of the authentication request (309).

FIG. 4 is a flowchart of example operations for mediating an authentication request for authentication technology migration. As discussed above, the authentication request is from an invoked secure interface program code that was signed with information that identifies the intermediary. Some of the example operations of FIG. 4 are similar to those in FIG. 2.

The intermediary receives a request with a security credential (401). The intermediary should receive requests from clients that have been provided the digitally signed program code for the secure interface. The intermediary receives the request over a secure connection established between the intermediary and the requesting client according to a communications protocol. This provides a first level of security for credentials. The intermediary records a request identifier that identifies the received request, which is later used by the intermediary to match with an authentication response.

The intermediary then determines whether the request includes a valid code signature (403). If the request was generated and sent from a secure interface, the request will include a digital signature of the intermediary. If the digital signature comprises a hash value, then the intermediary will compare the hash value against the intermediary's known digital signature hash. The digital signature may only comprise data that identifies the intermediary (e.g., application identifier, host device address, etc.). The intermediary may be associated with multiple digital signatures (e.g., a different signature for each authenticating system). The intermediary can validate some or all of the identifying information. If the request does not include a valid code signature, then intermediary discards the request (405). However, the intermediary can preserve the request or aspects of the request for forensic purposes. The intermediary can also notify the requestor that the request failed without providing a specific reason.

If the request includes a valid code signature, then the intermediary determines whether the request also includes a valid security token associated with the pairing of the intermediary and the requestor (407). If the security token is invalid (i.e., does not correctly represent the established trust relationship between the requestor and the intermediary) or absent, then the intermediary discards the request (405) and can notify the requestor of the failure. If the security token is valid, then the intermediary stores the security credential for possible migration (409). The intermediary can maintain data in a low latency and/or locally accessible memory, for example, that indexes in-flight authentication requests by identity and/or request identifier. Security credentials are removed when authentication responses are received and/or when a time period expires to avoid persisting security credentials at the intermediary. The operation(s) represented by 409 is depicted with a dashed line because it may not be performed if the migration target does not use the security credential type (e.g., does not use passwords). The intermediary may not have information in advance about the security data used by the migration target authentication technology and may store the security credential as a contingency. If the intermediary has information that indicates the migration target will not utilize the security credential, then the intermediary does not store the security credential since the security credential will not be migrated to the different authentication technology.

After storing the identity (409), the intermediary communicates the authentication request to an authentication destination indicated in the request (411). The secure interface may construct the authentication request with additional fields in a header or body of the authentication request or wrap an authentication request with header information. The additional fields and/or header information will have information used by the intermediary (e.g., the digital program code signature, a migration flag, and indication of authentication destination). The indication of the authentication destination can include a network address and port identifier that corresponds to an application that will authenticate the identity with the security credential. In some cases, the indication of the authentication destination can be an application identifier that the intermediary resolves to a location. For example, the intermediary may maintain a table of application identifiers that index to one or more locations that host a corresponding application. The intermediary can select from the one or more locations and communicate the authentication request to that selected location. If the authentication request is wrapped with the additional information used by the intermediary or the authentication request includes additional fields, the intermediary can remove the header and/or additional fields before communicating to the authentication destination.

FIG. 5 is a flowchart of example operations for processing an authentication response for authentication technology response. The intermediary processes authentication responses to determine whether to migrate a successfully authenticated identity.

The intermediary receives an authentication response (501). An intermediary can have multiple in-flight authentication requests and receive responses from different authenticators/authentication destinations. The intermediary communicates the received authentication response to the source of the authentication request (502).

The intermediary determines whether the identity was successfully authenticated (503). If the authentication response indicates failed authentication, then the intermediary can remove the security credential from the intermediary if previously stored at the intermediary (518). The intermediary looks up the identity with the request identifier and/or identity. If the intermediary determines that the identity was successfully authenticated (503), then the intermediary determines whether migration is indicated for the identity associated with the authentication response (507). The authentication response will indicate whether the identity is to be migrated. In addition, the authentication response will indicate the identity that was authenticated and a request identifier of the authentication request. The intermediary uses the identity and/or request identifier indicated in the authentication response to access a listing of in-flight requests. The source can be determined from the request identifier and/or communication protocol session/connection information. In contrast to FIG. 3, the system is migrating an identity to a different authentication technology. The intermediary may be migrating the identity to a different authentication technology on a same or different system as the current authentication technology being used. In addition, migrating the identity may include migration of the security credential. The authentication response may also indicate the migration target. In some embodiments, the migration target can also or alternatively be specified at the intermediary or as part of establishing the trust relationships discussed previously. If the identity is not being migrated, then the intermediary deletes the security credential from the intermediary if previously stored by the intermediary (518).

If the identity is being migrated, then the intermediary determines security data of the target authentication technology for the identity (513). If the identity is being migrated to a different authentication technology that does not use the security credential, then the intermediary may have already obtained the security data. For instance, the authentication request from the secure interface can include data that uniquely identifies the source device. The intermediary can provide this data that uniquely identifies the source device for authentication of the migrated identity at the migration target along with the identity itself. Based on the previously established trusts, the implementing system can accept the provided data to authenticate the identity and update its own data with the provided device identifying data and identity. In some cases, the security data can also include the security credential. For instance, the different authentication technology may be multi-factor authentication. The intermediary can provide the security credential and identity to the implementing system and allow the implementing system to establish the additional security credentials for the identity. If the security data for the target authentication technology has not already been provided to the intermediary, then the intermediary interacts with the client application to obtain the appropriate security data. This may involve additional information being input by a user and/or the client application obtaining the additional security data from the hosting device (e.g., a medium access control (MAC) address). Whether the security data includes the security credential or not, the intermediary communicates the security data to the migration target for use in the target authentication technology (515).

The intermediary notifies the requestor that the identity has been migrated to the migration target (517). To reduce communication overhead, the intermediary can notify the requestor that the migration was successful and not separately communicate a successful authentication if the client application can use the successful migration as implying that the authentication was successful. Since migration of the identity to a different authentication technology may present a different login interface and/or request different credentials, the notification of successful migration may be used to change the login process at the client. In addition, the notification can propagate to a user interface to reduce any surprise to a user. However, this notification is not necessary.

The above example illustrations refer to prior distribution of the digitally signed secure interface program code. Part of migrating an identity involves creating the initial authentication request with the secure interface program code. FIG. 6 depicts a flowchart of example operations for creating a secured authentication request. FIG. 6 refers to a secure login interface, which would be an executing instance of the secure login interface program code.

When invoked, the secure login interface identifies an application that invoked the secure login interface (601). The secure login interface can query the operating system or the invoking application for an identifier. Or, a call to instantiate the secure login interface may require an application identifier as an argument. The secure login interface will detect when an identity (e.g., username) and a security credential (e.g., password) are submitted to the secure login interface (603).

After detecting the identity and the security credential, the secure login interface determines migration target for the identity (605). A migration target may be predefined within the secure login interface program code for the invoking application and/or identity. Otherwise, the secure login interface can obtain a user defined or invoking application defined migration target.

With the credentials and the migration target, the secure login interface generates a request to facilitate the migration (607). The secure login interface generates the request with the submitted identity and security credential, an indication of the migration target, and an identifier that identifies the invoking application. The secure login interface also digitally signs the request with the digital signature that was previously provided with the secure login interface program code. Furthermore, the secure login interface includes the security token that identifies the trusted relationship between the intermediary and the requesting client.

Once the request is generated, the secure login interface communicates the generated request to an authentication migration intermediary (609). The secure login interface may have a destination for the generated request statically defined in the program code, or may have an initial destination statically defined in the program code. The secure login interface can also dynamically determine the destination (i.e., the intermediary) by querying a service that is defined in the program code.

Variations

The above examples describe migration being directed from an authenticating system or enterprise. In some cases, migration can be requested or directed by a client. The secure interface may allow migration to be optional (e.g., provide a user with an option to request migration, allow administrator settings that are condition dependent for migration, etc.), or the secure interface may be hardcoded to indicate migration for credentials submitted via the secure interface. When generating the request, the secure interface will set a flag or value that indicates whether or not the security credential is to be migrated. However, embodiments are not required to indicate migration in the request at the secure interface. In some embodiments, the intermediary can be configured to migrate based on certain criteria. For example, the intermediary can be configured to migrate security credentials for a specified system for a particular time period. Similarly, the migration target system can be indicated in the request, set at the intermediary, or dynamically determined based on a condition or criterion defined at the intermediary.

The above examples refer to an authentication migration intermediary determining whether or not an identity and/or security credential is to be migrated either based on configuration of the intermediary or information within the authentication request. In some embodiments, a policy can define when information is to be migrated. A secure login interface can dispatch a generated authentication request to a policy server for the policy server to determine, based on a policy, whether or not an identity/security credential is to be migrated. In some embodiments, the secure login interface program code is installed at a policy server. Client applications can submit authentication requests to the policy server, and the policy server can evaluate a governing policy(ies) to determine whether or not to migrate a corresponding identity/security credential. If the identity is to be migrated, then the policy server can invoke the secure login interface program code to generate a request to an authentication migration intermediary.

The above examples illustrate credential stores maintained separately from the intermediary. However, embodiment can be used in a deployment in which the intermediary maintains a credential store. The intermediary can maintain a credential store and perform the authentication prior to migration. The intermediary can maintain a credential store corresponding to a migration target. In some cases, the intermediary can perform both sides assuming the intermediary refers to a device that hosts program code for migrating credentials/identities. As an example, an intermediary can host multiple virtual machines. The program code for credential/identity migration, an authenticating application, and the migration target can each be in different virtual machines.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 303 and 307 of FIG. 3 can be performed in a different order. The order of operations between FIGS. 3 and 5 vary for multiple reasons, one of which is to indicate the possibility of communicating the authentication response to the requestor at a different time with respect to the other operations. With respect to FIG. 1, the operations represented by operation stages F and H can be performed in a different order. FIG. 6 describes operations for a client driven migration of a security credential or an identity to a different authentication technology. In some cases, a client application will not drive the migration. In that case, operations represented by block 605 will not be performed. In addition, the request will not indicate a migration target. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
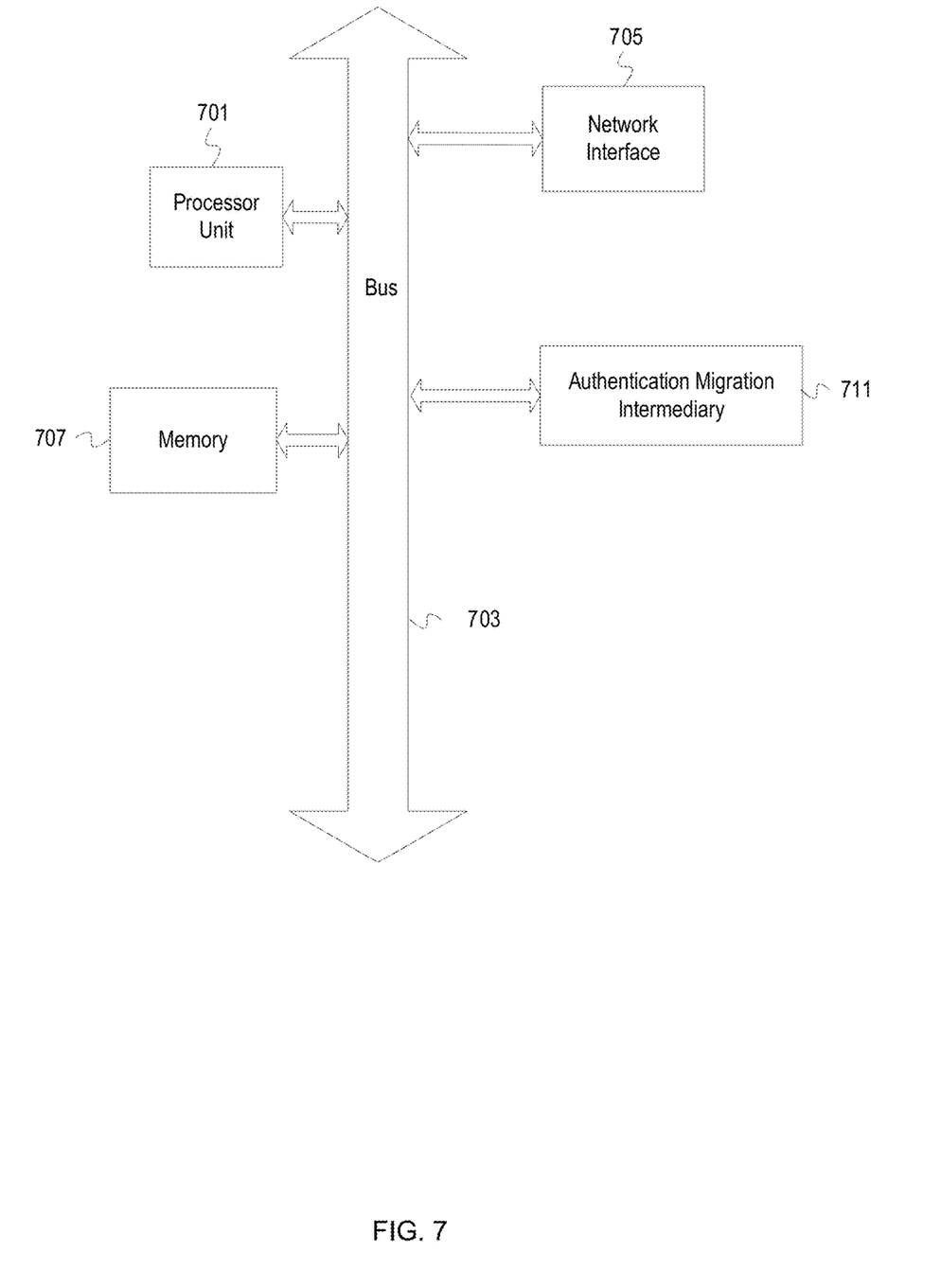
FIG. 7 depicts an example computer system with an authentication migration intermediary.

FIG. 7 depicts an example computer system with an authentication migration intermediary. The computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport® bus, InfiniBand® bus, NuBus, etc.) and a network interface 705 (e.g., a Fiber Channel interface, an Ethernet interface, an internet small computer system interface, SONET interface, wireless interface, etc.). The system also includes an authentication migration intermediary 711. The authentication migration intermediary 711 deploys digitally signed secure login interface program code to be used by client applications to submit authentication requests for identities that are being migrated. The authentication migration intermediary 711 determines whether an identity successfully authenticates and leverage that authentication to efficiently migrate the identity. Any one of the previously described functionalities may be partially (or entirely) implemented in hardware and/or on the processor unit 701. For example, the functionality may be implemented with an application specific integrated circuit, in logic implemented in the processor unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701 and the network interface 705 are coupled to the bus 703. Although illustrated as being coupled to the bus 703, the memory 707 may be coupled to the processor unit 701.

While the aspects of the disclosure are described with reference to various implementations and exploitations, it will be understood that these aspects are illustrative and that the scope of the claims is not limited to them. In general, techniques for identity migration as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   validating a digital program code signature received with an authentication request which includes a security credential for a first identity, wherein the authentication request indicates a first system that uses a first cryptographic technology to authenticate the first identity based on the security credential;
   validating a security token also received with the authentication request, wherein the security token represents a trust relationship between an intermediary that received the authentication request and a requestor of the authentication request;
   storing the security credential after validation of the authentication request based, at least in part, on the validating of the digital program code signature and the security token;
   communicating the authentication request to the first system after storing the security credential;
   in response to receipt of a successful authentication response from the first system for the first identity based on the security credential, generating a migrate request to update a credential store of a second system that uses a second cryptographic technology with the security credential and the first identity, wherein the migrate request includes the security credential; and
   communicating the migrate request to the second system.

2. The method of claim 1 further comprising communicating the authentication response to the requestor.

3. The method of claim 1, wherein the first cryptographic technology used to encode security credentials for authentication of identities and the second cryptographic technology used to encode security credentials and authenticate identities are different.

4. The method of claim 1 further comprising providing login interface program code to a set of one or more devices before receipt of the authentication request, wherein the login interface program code is signed with the digital program code signature and the set of one or more devices includes a first device which hosts the requestor of the authentication request.

5. The method of claim 1 further comprising determining whether the security credential is to be migrated to the second system based, at least in part, on the authentication response.

6. The method of claim 1 further comprising deleting the security credential either after communicating the migrate request to the second system or in response to receipt of a failed authentication response for the authentication request.

7. The method of claim 1 further comprising extracting the authentication request from a secured request generated with login interface program code previously provided to the requestor, wherein the secured request includes the digital program code signature and the security token as well as the authentication request.

8. The method of claim 1 further comprising discarding the authentication request in response to a determination that either the security token or the digital program code signature fails validation.

9. One or more non-transitory machine-readable media comprising program code for authentication migration, the program code to:
   validate a digital program code signature received with an authentication request which includes a security credential for a first identity, wherein the authentication request corresponds to a first authentication technology;
   validate a security token also received with the authentication request, wherein the security token represents a trust relationship between a device that received the authentication request and a requestor of the authentication request;
   communicate the authentication request to a first system that will authenticate the first identity with the security credential after successful validation of the digital program code signature and the security token; and
   in response to receipt of an authentication response that indicates successful authentication of the first identity and that indicates the first identity is to be migrated to a second authentication technology,
      obtain security data that will be used by the second authentication technology to authenticate the first identity; and
      migrate the first identity and the obtained security data to the second authentication technology, wherein the second authentication technology will authenticate the first identity based, at least in part, on the obtained security data.

10. The one or more non-transitory machine-readable media of claim 9, wherein the program code to obtain the security data comprises the program code to interact with a secure login interface corresponding to the authentication request to obtain the security data for the first identity, wherein the secure login interface is an instance of previously deployed program code signed with the digital program code signature.

11. The one or more non-transitory machine-readable media of claim 9 further comprising program code to generate the security token based on information that represents the trust relationship and to communicate the security token to the requestor.

12. An apparatus comprising:
   a processor; and
   a non-transitory machine-readable medium comprising program code executable by the processor to cause the apparatus to,
   validate a digital program code signature received with an authentication request which includes a security credential for a first identity;
   validate a security token also received with the authentication request, wherein the security token represents a trust relationship between the apparatus and a requestor of the authentication request;
   store the security credential for possible migration after validation of the authentication request based, at least in part, on validation of the digital program code signature and the security token;
   communicate the authentication request for authentication of the first identity after the security credential has been stored; and
   in response to receipt of a successful authentication response for the first identity and an indication of migration, migrate at least one of the first identity and the security credential to a different authentication system.

13. The apparatus of claim 12, wherein the program code to migrate comprises the program code executable by the processor unit to cause the apparatus to generate an update request to update the different authentication system to process subsequent authentication requests for the first identity.

14. The apparatus of claim 13, wherein the non-transitory machine-readable medium further comprises program code executable by the processor unit to cause the apparatus to obtain security data to be used by the different authentication system to authenticate the first identity in response to receipt of the successful authentication response.

15. The apparatus of claim 14, wherein the program code to migrate comprises program code to generate and communicate an update request to the different authentication system, wherein the update request comprises the security credential and an indication of the first identity.

16. The apparatus of claim 12, wherein the non-transitory machine-readable medium further comprises program code executable by the processor to cause the apparatus to provide login interface program code to a set of one or more devices before receipt of the authentication request, wherein the login interface program code is signed with the digital program code signature and the set of one or more devices includes a first device which hosts the requestor.

17. The apparatus of claim 12, wherein the non-transitory machine-readable medium further comprises program code executable by the processor to cause the apparatus to determine whether an authentication response indicates whether a migration is to be performed for at least one of an identity and a security credential corresponding to the authentication response.

18. The apparatus of claim 17, wherein the non-transitory machine-readable medium further comprises program code executable by the processor to cause the apparatus to delete the security credential either after the migration or in response to receipt of a failed authentication response for the authentication request.

19. The apparatus of claim 12, wherein the non-transitory machine-readable medium further comprises program code executable by the processor to cause the apparatus to extract the authentication request from a secured request generated with login interface program code previously provided to the requestor, wherein the secured request includes the digital program code signature and the security token as well as the authentication request.

20. The apparatus of claim 12, wherein the non-transitory machine-readable medium further comprises program code executable by the processor to cause the apparatus to discard the authentication request in response to a determination the authentication request cannot be validated based on the security token and the digital program code signature.

* * * * *